Aug. 7, 1923.
R. H. SMITH
MACHINE FOR BRICKING ICE CREAM
Original Filed Jan. 5, 1920   3 Sheets-Sheet 1
1,463,850
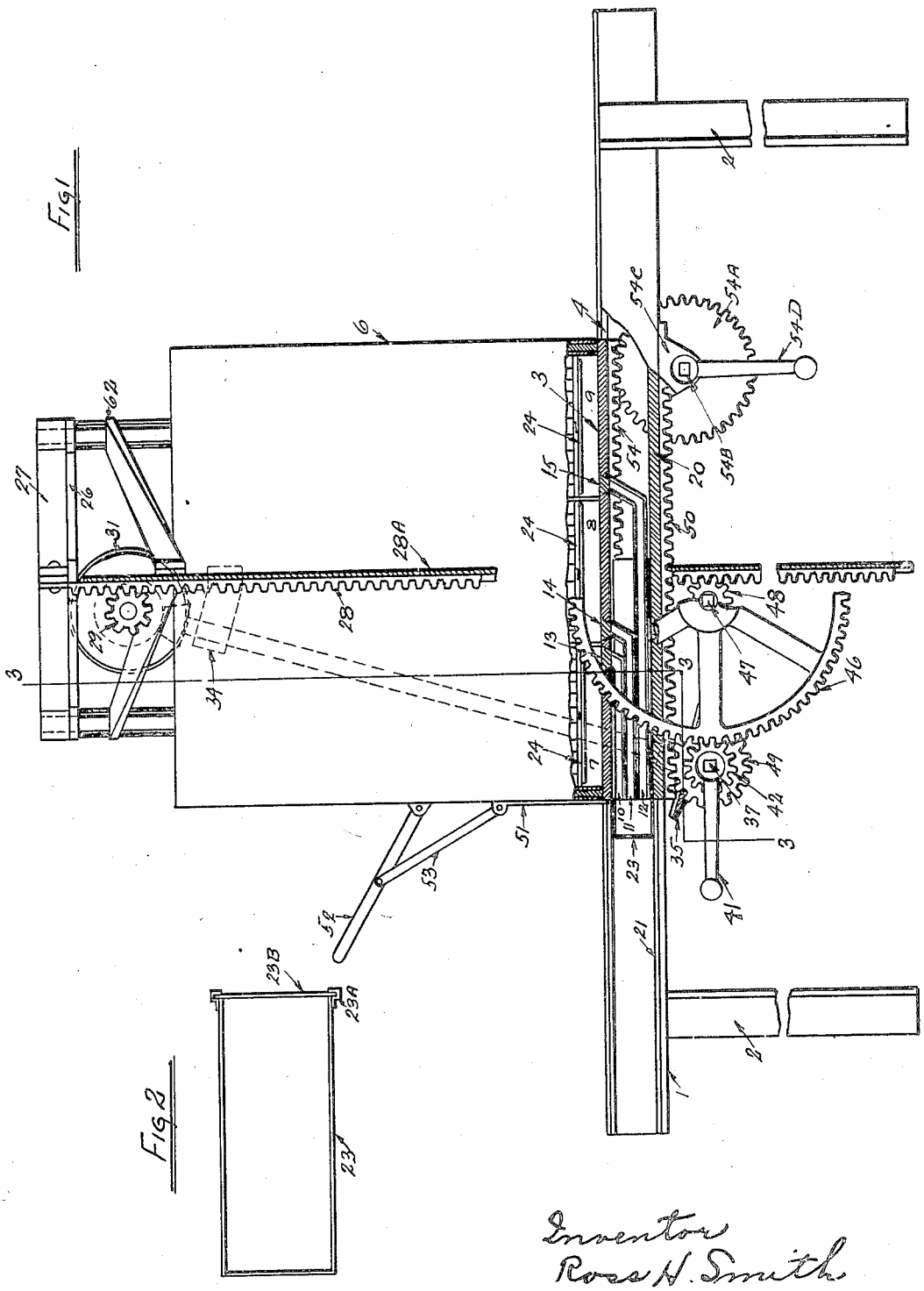

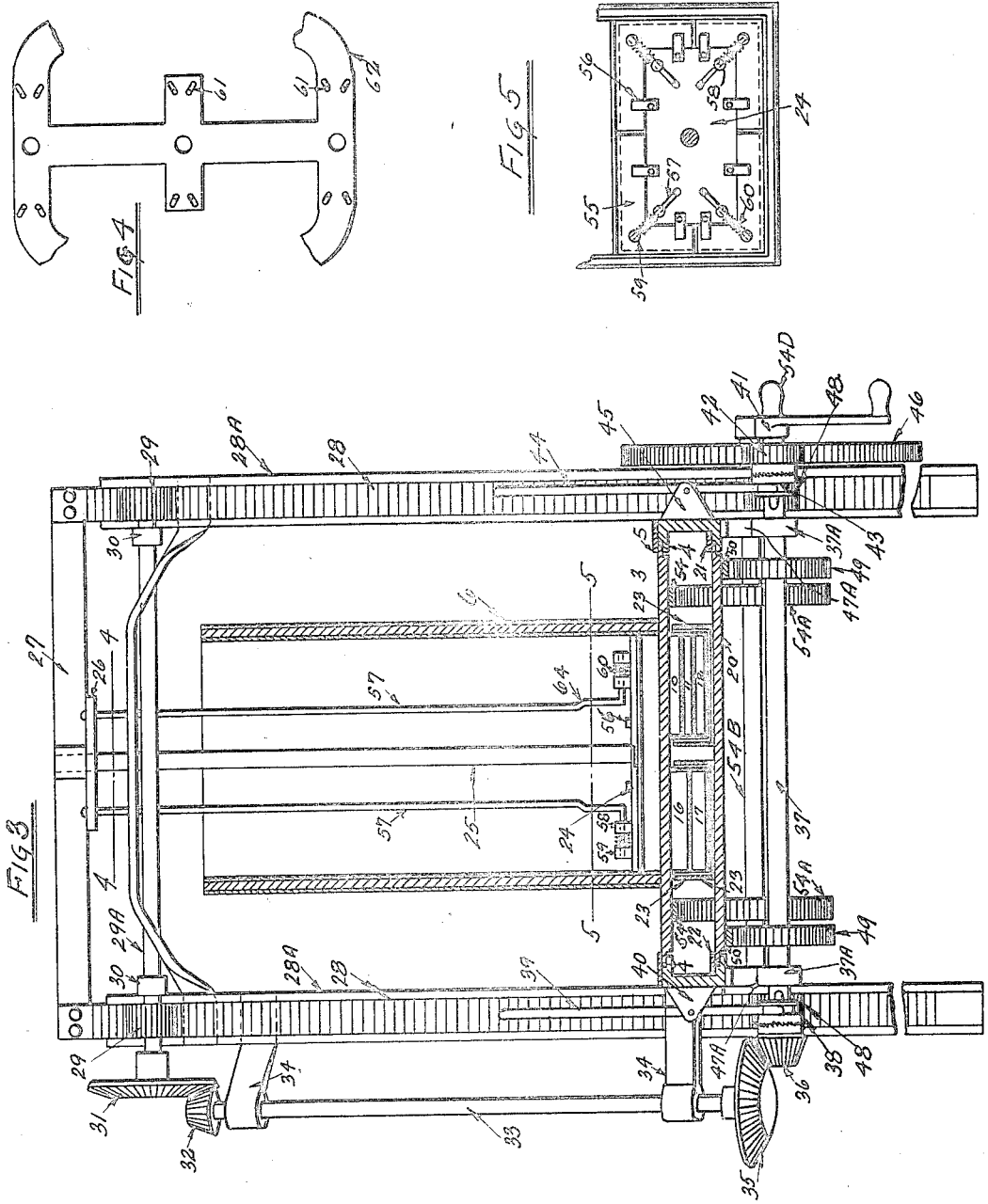

Aug. 7, 1923.  1,463,850
R. H. SMITH
MACHINE FOR BRICKING ICE CREAM
Original Filed Jan. 5, 1920  3 Sheets-Sheet 3
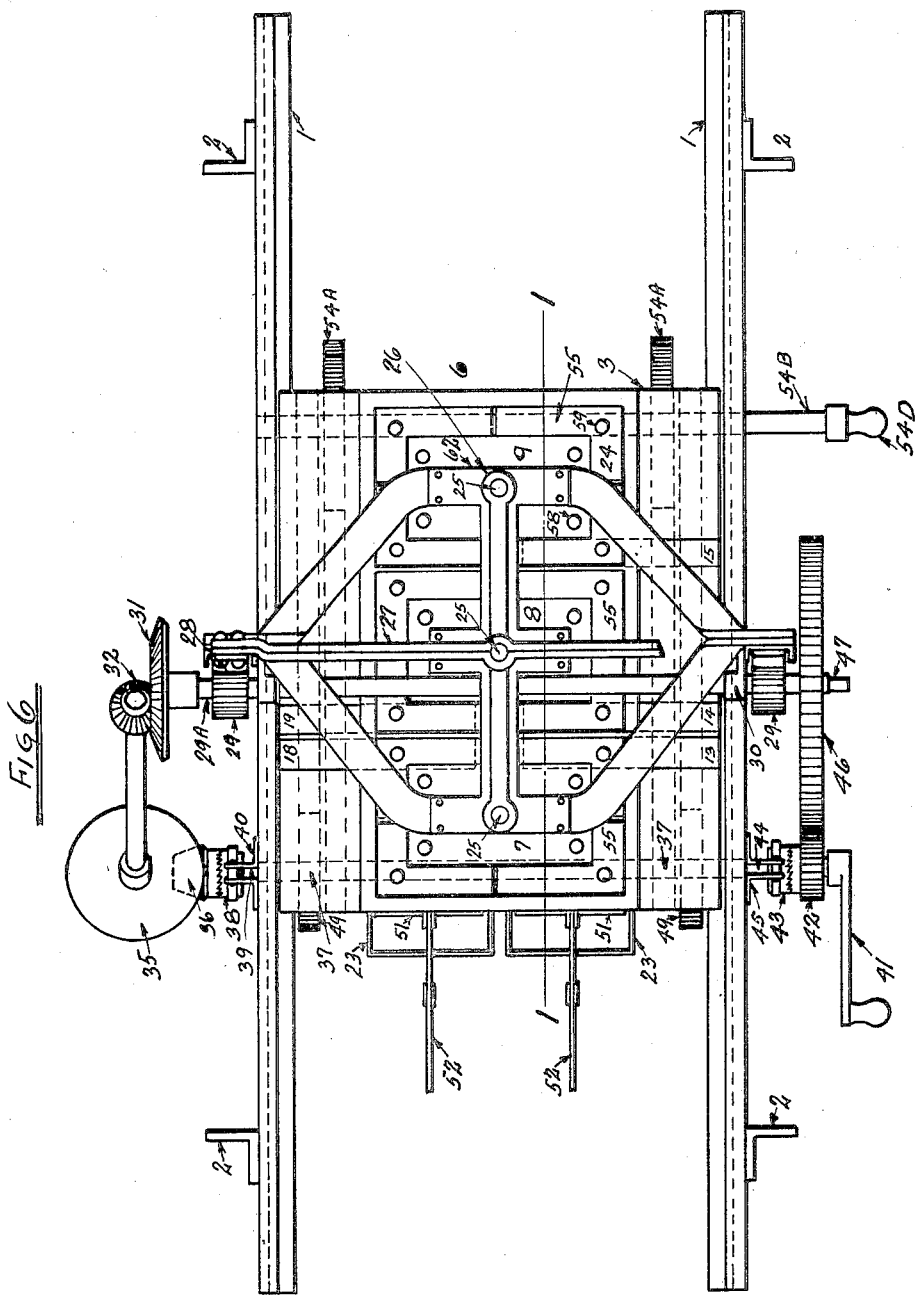

Patented Aug. 7, 1923.

1,463,850

UNITED STATES PATENT OFFICE.

ROSS H. SMITH, OF ERIE, PENNSYLVANIA.

MACHINE FOR BRICKING ICE CREAM.

Application filed January 5, 1920, Serial No. 349,446. Renewed November 29, 1922.

*To all whom it may concern:*

Be it known that I, Ross H. Smith, a citizen of the United States, residing at Erie, in the county of Erie and State of Pennsylvania, have invented new and useful Improvements in a Machine for Bricking Ice Cream, of which the following is a specification.

In making ice cream bricks it is desirable to form the bricks with the cream in a soft plastic state and with as little pressure as possible so that the cream will have as little density as possible. This is desirable for two reasons. First it makes it more palatable and at the same time increases the over-running. In forming bricks, therefore, the practice is to shape the bricks in this soft plastic form with as little pressure as possible and then complete the freezing while the brick is held in this shape. This has been more readily accomplished where the brick was formed of one kind of cream. Where, however, the cream has been formed in several layers, the usual practice has been to form a layer of the soft plastic cream, freeze it, and then apply another layer. Some attempts have been made to form the layers simultaneously but such methods have not gone into general practice. The purpose of this invention is to form bricks quickly and with little compression.

The machine for accomplishing the purpose is illustrated in the accompanying drawings as follows:—

Fig. 1 shows a side elevation, partly in section, on the line 1—1 in Fig. 6.

Fig. 2 a plan view of the mold case.

Fig. 3 a section on the line 3—3 in Fig. 1.

Fig. 4 a plan view of a plunger sealing plate guide.

Fig. 5 is a section on the line 5—5 in Fig. 3.

Fig. 6 a plan view of the machine.

1 marks the table or frame of the machine and 2 legs supporting the frame.

A sliding receptacle platform 3 is mounted in guides 4 on the sides of the frame and is held in place by the plates 5. A receptacle 6 is mounted on the platform 3 and as shown has three compartments 7, 8 and 9. Nozzles 10, 11 and 12 extend from one side of these compartments and gates 13, 14 and 15 control the inlets to these nozzles so that they may be connected with the receptacles or closed as desired. At the opposite sides of the receptacles 7 and 8 nozzles 16 and 17 are provided and these have the gates 18 and 19, the arrangement as will be readily apparent providing for forming bricks of two layers, or bricks of three layers, as may be desired. A sliding mold platfrom 20 is mounted in the guides 21 in the side frame. Plates 22 are arranged over the edges of the platform and hold it in place on the guide. Mold cases 23 are placed on the platform 20. They have one end open and guides 23ª are arranged at this open end into which gates 23ᵇ may be placed.

The mold cases are of a size to slip over the combined nozzles, of either the three layer or two layer side and make a sliding fit with these nozzles at the sides and bottom when in place and extend up the sides of the nozzles a sufficient distance to receive the soft plastic material from the nozzles. In making the cream according to my method the mold platform with the molds is moved to the right so that the closed ends of the molds are adjacent to the ends of the nozzles and as the soft plastic material is discharged from the nozzles the end of the case is moved away from the end of the nozzle, the movement being so proportioned that the movement of the case corresponds with the moving mass as it is discharged so that the soft plastic material is confined with a cross sectional shape corresponding to its shape when discharged and the layers of the material are formed in contact. In this way it is possible to form the brick of the soft plastic material and still keep the layers well-defined and the material is placed in the mold with so little pressure as to maintain its open or porous texture.

The compartments are provided with plungers 24. These plungers are carried by stems 25 which are mounted in a cross plate 26 and the cross plate is carried by a cross head 27. The cross heads are mounted on racks 28 and the racks operate in the guides 28ª extending upwardly from the frame. Pinions 29 mesh the racks 28. The pinions are carried by a shaft 29ª, the shaft being mounted in bearings 30 in the guides 28ª. A bevelled gear 31 is fixed on the shaft 29ª and meshes a pinion 32. The pinion 32 is fixed on a shaft 33 and the shaft 33 is mounted in bearings 34 extending from one of the guides 28ª. A bevelled gear 35 is fixed on the shaft 33 and meshes a pinion 36 journaled on a shaft 37. The shaft 37 is mounted in bearings 37ª carried by the frame 1. The pinion 36 may be locked or released from the shaft 37 by means of a clutch 38, the clutch being thrown by a lever 39 mounted in a bracket 40 extending from the side frame. A crank 41 is fixed on the end of the shaft 37. By means of this crank the shaft 37 may be turned and with it the plungers moved. This connection is designed to move the plungers of compartments 7, 8 and 9 at a speed which will deliver the plastic material from the nozzles 10, 11 and 12.

A pinion 42 is journaled on the shaft 37 and may be locked or released from the shaft 37 by a clutch 43. The clutch is thrown by a lever 44 mounted on a bracket 45 extending from the frame. The pinion 42 meshes a gear 46. The gear 46 is carried by a shaft 47 carried by bearings on the frame 47ª. Gears 48 are fixed on the shaft 47 and mesh the racks 28. The timing of this connection with the racks is such as to move the plungers of compartments 7 and 8 at a speed which will deliver the mass from the nozzles 16 and 17 in conformity to the movement of the mold. Where but two plungers are used it is obvious that they must be moved a little faster than where the three plungers are delivering to the mold.

Gears 49 are fixed on the shaft 37 and mesh racks 50 on the under side of the mold platform 20. These gears are so proportioned with relation to the driving connections through the racks 28 as to move the mold cases mounted on the platform 20 at a speed which will correspond to the discharge of the mass from the nozzles. Obviously in proportioning these cases and these connections the cross sections of the receptacles relatively to the cross section of the brick must be considered and the speed of the molds be enough faster than the plunger to compensate for the difference in cross section assuming that the receptacles are of larger cross section than the bricks as shown. When the open end of the mold case reaches a position opposite the end of the nozzle a gate 51 is moved down across the end of the nozzles. These gates are operated by levers 52 connected with the gate by links 53. The gates 23ᵇ are also placed in the molds. The gate 51, however, prevents the movement of the material from the ends of the nozzles while one mold case is being removed and another one inserted.

In order to fill the receptacles the plungers are lifted to a position above the receptacles and the receptacles are moved from under the plunger to a position in which they may be readily filled. This is accomplished by moving the receptacle support or frame 3. Racks 54 are arranged on the under-side of the supports and these mesh the gears 54ª. The gears 54ª are carried by a shaft 54ᵇ mounted in bearings 54ᶜ in the frame. A crank 54ᵈ is provided for operating the shaft 54ᵇ.

In order that the plunger may make a comparatively tight fit with the walls of the receptacle I prefer to provide spring-actuated plates 55 for making a closer fit with said walls. These plates 55 are mounted on the tops of the plungers and preferably are made in four parts. They are slidingly secured by means of the arms 56 which are secured to the top of the plungers and extend over the plates 55. Rods 57 extend from the posts 59 at the corners of the plates 55 through the posts 58 on the plungers 24 and springs 60 are mounted on the rods 57 between the posts 59 and 58 and crowd the plates 55 into contact with the walls of the receptacle. The rods 57 are bent upwardly and extend to the cross plates 26 to which they are secured. They extend through openings 61 in the guide plates 62, these guide plates being secured to the guides 28ª. The rods have the cam surface or bends 64 so that when the rods are drawn up with the plungers to a position which brings the bends 64 into engagement with the walls of the opening 61 they are forced inwardly thus retracting the plates 55 slightly from the side walls of the receptacle. The purpose of this is to assure the ready reentry of the plungers into the receptacles after the plungers have been withdrawn to permit the refilling of the receptacles and it is desired to return the plungers to the receptacles.

It will be noted that the crank 41 may be transferred to the shaft 47 which is provided with a squared end so that the plunger may be readily returned.

What I claim as new is:—

1. In a machine for bricking ice cream, the combination of a receptacle; means for squirting cream from the receptacle; a mounting for a mold for receiving the cream as it is squirted; and means for moving a mold on the mounting in proportion to the movement of the cream as it is discharged.

2. In a machine for bricking ice cream, the combination of a receptacle; means for squirting cream from the receptacle; a mounting for a mold for receiving the cream as it is squirted; means for moving a mold on the mounting in proportion to the movement of the cream as it is discharged; and means for cutting off the flow of cream and closing the mold.

3. In a machine for bricking ice cream, the combination of a plurality of receptacles; means for simultaneously squirting cream from the receptacles in the form of layers in contact from the point of discharge; and a mounting for a mold for receiving the cream as it is squirted.

4. In a machine for bricking ice cream, the combination of a plurality of receptacles; means for simultaneously squirting cream from the receptacles in the form of layers in contact from the point of discharge; a mounting for a mold for receiving the cream as it is squirted; and means for moving a mold on the mounting in proportion to the movement of the cream as it is squirted and at a speed corresponding to the movement of the cream.

5. In a machine for bricking ice cream, the combination of a receptacle; means for squirting cream from the receptacle; a mold support adapted to maintain a mold in position on the receptacle; and means for moving the mold support to move the mold in proportion to the movement of the cream at a speed corresponding to the movement of the cream.

6. In a machine for bricking ice cream, the combination of a receptacle; a plunger in the receptacle; a nozzle from which cream may be squirted from the receptacle through the action of the plunger; a mounting for a mold for receiving the cream as it is squirted; and means for moving the plunger and mold at a speed relatively to each other corresponding to the cross sections of the mold and plunger.

7. In a machine for bricking ice cream, the combination of a receptacle; a plunger in the receptacle; a cross head carrying the plunger; racks on the cross head; gears operating on the racks; a nozzle extending from the receptacle; a mold support; a gear connection for moving the mold support, said gear connection being connected with the gears operating on the racks, said gear connection being proportioned to drive the plunger and mold support at speeds proportioned to the cross sections of the nozzle and plunger.

8. In a machine for bricking ice cream, the combination of a plurality of receptacles; a plunger in each receptacle; a plurality of nozzles leading from said receptacles; gates between the nozzles and the receptacles; devices for moving a mold with the cream as it is discharged from the nozzles; and means for varying the speed of the plungers with relation to said devices and with relation to the nozzles connected with the receptacles.

9. In a machine for bricking ice cream, the combination of a plurality of receptacles; nozzles leading from said receptacles and terminating in position to deliver material in layers and in contact, said nozzles forming bricks of different numbers of layers and being connected to different numbers of receptacles; plungers in said receptacles; gates for connecting or disconnecting the nozzles; devices for moving a mold with the cream as discharged; and means for actuating the plungers, said means corresponding with said devices to vary the speed of the plungers relatively to the devices as the number of plungers delivering is varied.

10. In a machine for bricking ice cream, the combination of a plurality of receptacles; plungers in said receptacles; a cross head carrying said plungers; racks on said cross head; a drive shaft; clutches on said shaft; gears on said shaft adapted to be engaged or disengaged from said shaft by said clutches; a gear connection between one of said gears and the racks giving to said racks one speed; a gear connection between the other gear on said shaft and said racks giving to said racks another speed; nozzles extending from said receptacles, one nozzle extending to a greater number of receptacles than the other of said nozzles; gates between the receptacles and nozzles; and devices for moving a mold when the cream is discharged, said gear connections varying the speed to proportion the movement of the plungers to the number of receptacles discharging.

11. In a machine for bricking ice cream, the combination of a receptacle; a nozzle extending from the receptacle; a plunger in the receptacle; and spring-pressed plates between the plunger and the walls of the receptacle comprising means for retracting the plates as the plunger is lifted above the receptacle.

12. In a machine for bricking ice cream, the combination of a receptacle; a plunger operating in the receptacle and adapted to move above the receptacle, said receptacle having a nozzle extending from the receptacle at an angle to the direction of movement of the plunger; means for holding a container for receiving the cream from the nozzle; and means for moving the receptacle with its nozzle from under the plunger to fill the receptacle.

13. In a machine for bricking ice cream, the combination of a receptacle; a nozzle extending from the receptacle; a plunger in the receptacle; spring-pressed plates between the plunger and the walls of the receptacle comprising means for retracting the plates as the plunger is lifted above the receptacle; and means for moving the receptacle from under the plunger.

14. In a machine for bricking ice cream, the combination of a sliding receptacle support; a receptacle on the support; a nozzle extending from the receptacle; a mold support below the receptacle support; and means for moving the mold support.

15. In a machine for bricking ice cream, the combination of a sliding receptacle support; a receptacle on the support; a nozzle extending from the receptacle; a mold support below the receptacle support; means for moving the mold support; a plunger in the receptacle; and means for retracting the plunger to a point above the receptacle.

16. In a machine for bricking ice cream, the combination of a receptacle; a plunger in the receptacle; a cross head carrying the plunger; spring-actuated plates between the plunger and the side walls of the receptacle; rods secured to said plates and having cam surfaces thereon; and guides through which said rods move as the plunger is lifted, said guides engaging the cam surfaces to retract the plates.

17. In a machine for bricking ice cream, the combination of a receptacle; a plunger operating in the receptacle; a nozzle leading from the receptacle and squirting material under the action of the plunger in a direction crosswise to the movement of the plunger; and a mounting for a mold permitting a movement of the mold in a direction across the direction of movement of the plunger for receiving the cream as it is discharged from the nozzle.

18. In a machine for bricking ice cream, the combination of a receptacle; a plunger operating in the receptacle; a nozzle leading from the receptacle and squirting material under the action of the plunger in a direction crosswise to the movement of the plunger; and devices for moving a mold in a direction across the direction of movement of the plunger for receiving the cream as it is discharged from the nozzle.

19. In a machine for bricking ice cream, the combination of a receptacle; a plunger operating in the receptacle; a nozzle leading from the receptacle and squirting material under the action of the plunger in a direction crosswise to the movement of the plunger; and means for moving a mold in a direction across the direction of movement of the plunger for receiving the cream as it is discharged from the nozzle, said means moving the mold in proportion to the movement of the cream as it is discharged.

20. In a machine for bricking ice cream, the combination of a plurality of receptacles; plungers in said receptacles; a plurality of nozzles leading to a common discharge point from said receptacles, the direction of discharge from the nozzles being across the direction of movement of the plungers; and a mounting for a mold permitting a movement of a mold on the mounting in a direction across the direction of movement of the plungers for receiving the cream as it is discharged from the nozzles.

21. In a machine for bricking ice cream, the combination of a plurality of receptacles; plungers in said receptacles; a plurality of nozzles leading to a common discharge point from said receptacles, the direction of discharge from the nozzles being across the direction of movement of the plungers; and devices for moving a mold in a direction across the direction of movement of the plungers for receiving the cream as it is discharged from the nozzles, said devices moving the mold in proportion to the movement of the cream as it is discharged.

22. In a machine for bricking ice cream, the combination of a plurality of receptacles; plungers in said receptacles; a plurality of nozzles leading to a common discharge point from said receptacles, the direction of discharge from the nozzles being across the direction of movement of the plungers; devices for moving a mold in a direction across the direction of movement of the plungers for receiving the cream as it is discharged from the nozzles, said devices moving the mold in proportion to the movement of the cream as it is discharged; and means for severing the cream and closing the mold.

23. In a machine for bricking ice cream, the combination of a receptacle; a plunger operating in the receptacle; a nozzle leading from the receptacle and squirting material under the action of the plunger in a direction crosswise to the movement of the plunger; means for moving a mold in a direction across the direction of movement of the plunger for receiving the cream as it is discharged from the nozzle, said means moving the mold in proportion to the movement of the cream as it is discharged; and means for severing the cream and closing the mold.

In testimony whereof I have hereunto set my hand.

ROSS H. SMITH.